US006918316B2

(12) United States Patent
Johansson et al.

(10) Patent No.: US 6,918,316 B2
(45) Date of Patent: Jul. 19, 2005

(54) ADJUSTABLE PEDAL ASSEMBLY

(75) Inventors: Mattias Johansson, Nittorp (SE); Gunnar Fornell, Dalstorp (SE)

(73) Assignee: Technology Holding Company, Wilmington, DE (US)

( * ) Notice: Subject to any disclaimer, the term of this patent is extended or adjusted under 35 U.S.C. 154(b) by 0 days.

(21) Appl. No.: 10/091,889

(22) Filed: Mar. 5, 2002

(65) Prior Publication Data

US 2002/0092374 A1 Jul. 18, 2002

Related U.S. Application Data

(63) Continuation of application No. 09/654,642, filed on Sep. 5, 2000, now Pat. No. 6,374,695, which is a continuation of application No. 09/174,748, filed on Oct. 19, 1998, now Pat. No. 6,151,984.

(30) Foreign Application Priority Data

Nov. 24, 1997 (SE) .............................................. 9704288

(51) Int. Cl.[7] .......................... G05G 1/14; B60K 26/00

(52) U.S. Cl. ............................ 74/512; 74/514; 180/334

(58) Field of Search .......................... 74/512, 513, 514, 74/560; 180/334; 188/158; 364/426

(56) References Cited

U.S. PATENT DOCUMENTS 122,839 A 1/1872 Livingstone
1,425,413 A 8/1922 Page (Continued)

FOREIGN PATENT DOCUMENTS

EP 0139082 5/1985
EP 0420829 4/1991

(Continued)

OTHER PUBLICATIONS

Ventra, Delphi Join to Make Power Pedals, The Globe and Mail, dated Jun. 15, 2000.

Delta Fins, Simplified Systems Increase Learjet 55C Reliability, Aviation Week & Space Technology, author Edward H. Phillips, dated Oct. 31, 1988.

(Continued)

*Primary Examiner*—David A. Bucci
*Assistant Examiner*—Colby Hansen
(74) *Attorney, Agent, or Firm*—Howard & Howard

(57) ABSTRACT

An adjustable pedal assembly includes a mounting arrangement (1) for attachment to a vehicle structure (37), an accelerator pedal (6), a brake pedal (7), and a clutch pedal (8). The pedals (6, 7, 8) are pivotally supported with respect to the mounting arrangement (1) and define a first pivot axis (9). An adjustment element (5) is pivotally supported with respect to the mounting structure (1) and defines a second pivot axis (4). The adjustment element (5) selectively moves the pedals (6, 7, 8) between a plurality of operable positions. The adjustable pedal assembly is characterized by the pedals (6, 7, 8) being pivotally supported with respect to the adjustment element (5) wherein the second pivot axis (4) is generally parallel to the first pivot axis (9). A driving mechanism with an electric motor (11) and gear assembly (12) is used to rotate the adjustment element (5) about the second pivot axis (4). The pedals (6, 7, 8) are pivotally mounted within the adjustment element (5) to pivot about the first pivot axis (9), thus the first pivot axis (9) moves with respect to the second pivot axis (4) when the adjustment element (5) is rotated.

25 Claims, 3 Drawing Sheets

U.S. PATENT DOCUMENTS 1,454,258 A 5/1923 Adams
1,608,611 A 11/1926 Milburn
1,746,008 A 2/1930 Minshall
1,774,558 A 9/1930 Laddon et al.
1,795,910 A 3/1931 Wait, Jr.
1,814,576 A 7/1931 Tatter
1,844,607 A 2/1932 Sikorsky
1,873,906 A 8/1932 Ring et al.
1,879,859 A 9/1932 Stinson
1,884,701 A 10/1932 Howard
1,902,094 A 3/1933 Page, Jr.
1,919,520 A 7/1933 Laddon et al.
1,929,409 A 10/1933 Carr ........................... 180/77
1,998,677 A 4/1935 Laddon et al. ................ 244/29
2,048,448 A 7/1936 Hofer .......................... 244/29
2,074,730 A 3/1937 Kerr, Jr. ...................... 244/86
2,192,714 A 3/1940 Norman et al. ............. 137/139
2,207,435 A 7/1940 Jones .......................... 74/513
2,379,774 A 3/1945 Wyer
2,420,528 A 5/1947 Eaton, Jr. et al. ............. 74/478
2,423,006 A 6/1947 Chambers et al. ............. 192/3
2,424,523 A 7/1947 Watter ......................... 244/86
2,433,146 A 12/1947 Odell, Jr. ..................... 244/86
2,468,977 A 5/1949 Hobbs ......................... 84/230
2,478,546 A 8/1949 Pickens et al. ............... 244/86
2,516,397 A 7/1950 Kress et al. .................. 74/478
2,550,731 A 5/1951 Tack .......................... 188/196
2,550,732 A 5/1951 Tack et al. .................. 188/197
2,585,688 A 2/1952 Saulnier ...................... 244/86
2,610,006 A 9/1952 Boyce ........................ 244/86
2,620,042 A 12/1952 Vincent
2,621,538 A 12/1952 Bechman et al.
2,669,284 A 2/1954 Pall et al. ..................... 155/14
2,697,566 A 12/1954 Glass .......................... 244/83
2,757,630 A 8/1956 Ottinger ..................... 114/153
2,822,882 A 2/1958 Campbell .................. 180/82.1
2,825,418 A 3/1958 Kershman .................... 180/77
2,847,872 A 8/1958 Todd ........................... 74/478
2,853,164 A 9/1958 Sturdy ........................... 192/3
2,860,720 A 11/1958 Huff et al.
2,908,183 A 10/1959 Di Giovanni
2,936,867 A 5/1960 Perry
2,992,797 A 7/1961 Visser
3,151,499 A 10/1964 Roe
3,301,088 A 1/1967 White
3,319,487 A 5/1967 Lystad et al. ................. 74/560
3,338,348 A 8/1967 Roethlisberger et al.
3,400,607 A 9/1968 Smith
3,430,512 A 3/1969 Wossner ...................... 74/512
3,511,109 A 5/1970 Tanaka
3,563,111 A 2/1971 Zeigler ........................ 74/512
3,576,302 A 4/1971 Palfreyman .................. 244/83
3,630,326 A 12/1971 Kawaguchi ................. 192/3 S
3,631,739 A 1/1972 McArthur
3,641,837 A 2/1972 Dean, Jr. ..................... 74/513
3,643,198 A 2/1972 Economu .................... 338/162
3,643,524 A 2/1972 Herring
3,643,525 A 2/1972 Gibas
3,646,831 A 3/1972 Janosi ......................... 74/518
3,665,231 A 5/1972 Wendler ...................... 310/77
3,678,779 A 7/1972 Jonosi ......................... 74/516
3,691,868 A 9/1972 Smith
3,695,379 A 10/1972 Veilleux ..................... 180/103
3,702,458 A 11/1972 Capachietti, Sr. et al. 340/52 R
3,732,447 A 5/1973 Perhats ........................ 310/76
3,754,480 A 8/1973 Bodnar et al.
3,757,604 A 9/1973 Schroeder .................... 74/529
3,757,758 A 9/1973 Stoltman ............ 123/198 DB
3,765,264 A 10/1973 Bruhn, Jr.
3,785,596 A 1/1974 Chinchester-Miles ..... 244/83 R
3,798,995 A 3/1974 Schroter
3,828,625 A 8/1974 Bruhn, Jr.
3,857,304 A 12/1974 Berndt ........................ 74/877
3,861,237 A 1/1975 Mounts ....................... 74/516
3,931,943 A 1/1976 Westergren et al. .......... 244/86
3,942,816 A 3/1976 Scherenberg et al.
3,943,795 A 3/1976 Kenney ..................... 74/562.5
3,954,041 A 5/1976 Mechulam et al.
3,958,677 A 5/1976 Spanelis
3,975,972 A 8/1976 Muhleck
3,986,363 A 10/1976 Beaman et al. ............... 60/700
3,990,715 A 11/1976 Shimada
3,995,510 A 12/1976 Yost .......................... 74/478.5
4,004,537 A 1/1977 Nilsson .................. 114/144 R
4,006,402 A 2/1977 Mincuzzi ..................... 323/94
4,007,647 A 2/1977 Carlson .................... 74/501 R
4,037,487 A 7/1977 Ahlschwede et al. ......... 74/529
4,047,145 A 9/1977 Schwehr
4,087,776 A 5/1978 Donato ....................... 338/198
4,088,977 A 5/1978 Bowman, Jr. et al. .... 338/32 R
4,117,401 A 9/1978 Glauert ....................... 324/208
4,120,387 A 10/1978 Otteblad et al.
4,123,740 A 10/1978 Palmer et al. ................ 338/67
4,132,970 A 1/1979 Masuda et al. ........... 338/32 R
4,134,560 A 1/1979 Messerschmidt
4,182,198 A 1/1980 Dartnell ....................... 74/513
4,237,752 A 12/1980 Hildebrecht
4,297,550 A 10/1981 Leighton ................. 200/61.89
4,327,414 A 4/1982 Klein ......................... 364/426
4,334,352 A 6/1982 VanBenthuysen ............ 29/620
4,335,689 A 6/1982 Abe et al. ................... 123/339
4,345,235 A 8/1982 Riley et al. ................. 338/176
4,355,293 A 10/1982 Driscoll ...................... 338/184
4,385,528 A 5/1983 Pauwels
4,386,537 A 6/1983 Lewis
4,392,375 A 7/1983 Eguchi et al. ................ 73/118
4,413,714 A 11/1983 Windsor .................. 192/0.033
4,418,810 A 12/1983 Windsor .................. 192/0.076
4,424,719 A 1/1984 Pretsch ...................... 74/89.15
4,426,890 A 1/1984 Hansen ........................ 74/478
4,430,634 A 2/1984 Hufford et al. ............. 338/164
4,432,445 A 2/1984 Windsor .................. 192/0.076
4,435,691 A 3/1984 Ginn .......................... 338/125
4,470,570 A 9/1984 Sakurai et al. .............. 244/235
4,489,474 A 12/1984 Brown et al. ................. 29/508
4,497,217 A 2/1985 Hansen ........................ 74/512
4,497,397 A 2/1985 Windsor et al. ......... 192/0.076
4,497,399 A 2/1985 Kopich
4,505,151 A 3/1985 Sauerschell et al.
4,518,064 A 5/1985 Windsor .................... 192/3.58
4,519,360 A 5/1985 Murakami .................. 123/399
4,528,590 A 7/1985 Bisacquino et al.
4,537,168 A 8/1985 Durisin ................... 123/198 R
4,561,530 A 12/1985 Parsons et al. .......... 192/0.076
4,566,418 A 1/1986 Yamamoto et al. ......... 123/479
4,582,653 A 4/1986 Blanchard et al. ............ 261/65
4,601,271 A 7/1986 Ejiri et al. .................. 123/361
4,603,675 A 8/1986 Junginger et al. .......... 123/478
4,612,615 A 9/1986 Murakami ............. 364/431.07
4,616,504 A 10/1986 Overcash et al. .......... 73/118.1
4,621,250 A 11/1986 Echasseriau et al. ........ 338/162
4,638,898 A 1/1987 Braun ..................... 192/0.052
4,640,248 A 2/1987 Stoltman .................... 423/399
4,658,939 A 4/1987 Kircher et al. .............. 188/156
4,660,520 A 4/1987 Inoue et al. ................ 123/399
4,677,880 A 7/1987 Hattori et al. ................ 74/866
4,683,977 A 8/1987 Salmon
4,688,420 A 8/1987 Minagawa ................. 73/118.1
4,691,677 A 9/1987 Hotate et al. ............... 123/399
4,693,111 A 9/1987 Arnold et al. ............. 73/118.1
4,695,819 A 9/1987 Bowsher ..................... 338/153

| | | | | |
|---|---|---|---|---|
| 4,698,535 | A | 10/1987 | Shiraki et al. | 310/156 |
| 4,703,649 | A | 11/1987 | Eitoku et al. | 73/118.1 |
| 4,718,380 | A | 1/1988 | Katayose et al. | 123/399 |
| 4,727,838 | A | 3/1988 | Oshiage et al. | 123/361 |
| 4,727,840 | A | 3/1988 | Nishida et al. | 123/399 |
| 4,733,214 | A | 3/1988 | Andresen | 338/128 |
| 4,735,183 | A | 4/1988 | Inoue et al. | 123/399 |
| 4,747,380 | A | 5/1988 | Ejiri et al. | 123/399 |
| 4,772,829 | A | 9/1988 | Pickering et al. | 318/139 |
| 4,779,592 | A | 10/1988 | Takeuchi et al. | 123/399 |
| 4,799,848 | A | 1/1989 | Buckley | |
| 4,802,381 | A | 2/1989 | Lo | 74/513 |
| 4,819,500 | A | 4/1989 | Musumiya et al. | 74/513 |
| 4,831,985 | A | 5/1989 | Mabee et al. | 123/399 |
| 4,841,798 | A | 6/1989 | Porter et al. | 74/501.5 R |
| 4,848,708 | A | 7/1989 | Farrell et al. | |
| 4,850,319 | A | 7/1989 | Imoehl | 123/361 |
| 4,850,322 | A | 7/1989 | Uthoff et al. | 123/399 |
| 4,853,556 | A | 8/1989 | Pfalzgraf et al. | 307/10.1 |
| 4,854,424 | A | 8/1989 | Yamatoh et al. | 188/72.1 |
| 4,864,886 | A | 9/1989 | Burgei | 74/536 |
| 4,869,220 | A | 9/1989 | Imoehl | 123/399 |
| 4,870,871 | A | 10/1989 | Ivan | |
| 4,875,384 | A | 10/1989 | Hirayama et al. | 74/500.5 |
| 4,875,385 | A | 10/1989 | Sitrin | |
| 4,881,424 | A | 11/1989 | Clark et al. | 74/523 |
| 4,883,037 | A | 11/1989 | Mabee et al. | |
| 4,889,005 | A | 12/1989 | Crack | 74/501.6 |
| 4,899,614 | A | 2/1990 | Kataumi | |
| 4,905,544 | A | 3/1990 | Ganoung | 74/858 |
| 4,912,997 | A | 4/1990 | Malcolm et al. | 74/335 |
| 4,915,075 | A | 4/1990 | Brown | |
| 4,938,304 | A | 7/1990 | Yamaguchi et al. | |
| 4,942,949 | A | 7/1990 | Dai | 192/1.32 |
| 4,944,269 | A | 7/1990 | Imoehl | |
| 4,949,590 | A | 8/1990 | Barker et al. | 74/512 |
| 4,958,607 | A | 9/1990 | Lundberg | |
| 4,969,437 | A | 11/1990 | Kolb | |
| 4,975,844 | A | 12/1990 | Holbrook et al. | 364/424.1 |
| 4,976,166 | A | 12/1990 | Davis et al. | 74/512 |
| 4,986,238 | A | 1/1991 | Terazawa | |
| 4,989,474 | A | 2/1991 | Cicotte et al. | |
| 4,995,483 | A | 2/1991 | Moseley et al. | 188/162 |
| 5,003,483 | A | 3/1991 | Hedstrom | 364/426.04 |
| 5,010,782 | A | 4/1991 | Asano et al. | |
| 5,013,930 | A | 5/1991 | Spakowski et al. | 307/10.1 |
| 5,031,595 | A | 7/1991 | Heck et al. | 123/339 |
| 5,036,576 | A | 8/1991 | Gast | 29/407 |
| 5,039,975 | A | 8/1991 | Ishihara | 338/312 |
| 5,045,035 | A | 9/1991 | Ganoung | 475/42 |
| 5,054,570 | A | 10/1991 | Naito et al. | 180/170 |
| 5,056,742 | A | 10/1991 | Sakurai | 244/235 |
| 5,057,728 | A | 10/1991 | Dammeyer et al. | 310/77 |
| 5,063,811 | A | 11/1991 | Smith et al. | |
| 5,067,368 | A | 11/1991 | Itakura et al. | 74/560 |
| 5,078,024 | A | 1/1992 | Cicotte et al. | |
| 5,086,663 | A | 2/1992 | Asano et al. | |
| 5,086,883 | A | 2/1992 | Schroder | 187/127 |
| 5,121,889 | A | 6/1992 | Carey, Jr. | |
| 5,125,483 | A | 6/1992 | Kitagawa et al. | |
| 5,133,225 | A | 7/1992 | Lundberg et al. | 74/560 |
| 5,133,321 | A | 7/1992 | Hering et al. | 123/399 |
| 5,157,956 | A | 10/1992 | Isaji et al. | 73/1 D |
| 5,158,459 | A | 10/1992 | Edelberg | |
| 5,161,422 | A | 11/1992 | Suman et al. | 74/335 |
| 5,172,606 | A | 12/1992 | Dzioba et al. | 74/512 |
| 5,174,171 | A | 12/1992 | Martinsson et al. | |
| 5,211,072 | A | 5/1993 | Barlas et al. | |
| 5,214,834 | A | 6/1993 | Froment | 29/434 |
| 5,215,057 | A | 6/1993 | Sato et al. | |
| 5,217,094 | A | 6/1993 | Walter et al. | 188/210 |
| 5,233,882 | A | 8/1993 | Byram et al. | |
| 5,237,891 | A | 8/1993 | Neubauer et al. | |
| 5,238,080 | A | 8/1993 | Fastie | 180/178 |
| 5,239,886 | A | 8/1993 | Kohring | 74/574 |
| 5,241,936 | A | 9/1993 | Byler et al. | |
| 5,253,545 | A | 10/1993 | Barrons et al. | |
| 5,255,653 | A | 10/1993 | Ironside et al. | 123/399 |
| 5,295,409 | A | 3/1994 | Byram et al. | 74/514 |
| 5,320,076 | A | 6/1994 | Reppich et al. | 123/399 |
| 5,321,980 | A | 6/1994 | Hering et al. | |
| 5,351,573 | A | 10/1994 | Cicotte | |
| 5,381,769 | A | 1/1995 | Nishiigaki et al. | 123/399 |
| 5,385,068 | A | 1/1995 | White et al. | |
| 5,396,869 | A | 3/1995 | Suzuki et al. | 123/399 |
| 5,396,870 | A | 3/1995 | Beale | |
| 5,408,899 | A | 4/1995 | Stewart | |
| 5,415,144 | A | 5/1995 | Hardin et al. | 123/399 |
| 5,416,295 | A | 5/1995 | White et al. | |
| 5,438,516 | A | 8/1995 | Neubauer et al. | |
| 5,441,290 | A | 8/1995 | Morgan et al. | |
| 5,445,126 | A | 8/1995 | Graves, Jr. | 123/399 |
| 5,460,061 | A | 10/1995 | Redding et al. | 74/512 |
| 5,481,141 | A | 1/1996 | Brown et al. | 307/106 |
| 5,497,677 | A | 3/1996 | Baumann et al. | |
| 5,507,201 | A | 4/1996 | Fairbairn et al. | |
| 5,546,827 | A | 8/1996 | Pospisil | 74/502.4 |
| 5,552,807 | A | 9/1996 | Hayes et al. | |
| 5,632,183 | A | 5/1997 | Rixon et al. | |
| 5,632,184 | A | 5/1997 | Callicutt et al. | 74/512 |
| 5,676,220 | A | 10/1997 | Dapsi et al. | |
| 5,685,200 | A | 11/1997 | Baumann | 74/512 |
| 5,697,260 | A | 12/1997 | Rixon et al. | |
| 5,722,302 | A | 3/1998 | Rixon et al. | 74/512 |
| 5,768,946 | A | 6/1998 | Fromer et al. | 74/514 |
| 5,771,064 | A | 6/1998 | Lett | 348/10 |
| 5,771,752 | A | 6/1998 | Cicotte | |
| 5,771,773 | A | 6/1998 | Sakamoto et al. | |
| 5,819,593 | A | 10/1998 | Rixon et al. | |
| 5,823,064 | A | 10/1998 | Cicotte | 74/512 |
| 5,828,290 | A | 10/1998 | Buss et al. | 338/162 |
| 5,855,143 | A | 1/1999 | Ewing | |
| 5,868,039 | A | 2/1999 | Baumann | |
| 5,868,040 | A | 2/1999 | Papenhagen et al. | |
| 5,884,532 | A | 3/1999 | Rixon et al. | |
| 5,887,488 | A | 3/1999 | Riggle | |
| 5,890,399 | A | 4/1999 | Rixon et al. | |
| 5,894,762 | A | 4/1999 | Arao et al. | |
| 5,896,781 | A | 4/1999 | Muller | |
| 5,901,614 | A | 5/1999 | Ewing | |
| 5,913,946 | A | 6/1999 | Ewing | |
| 5,927,153 | A | 7/1999 | Bhangoo et al. | |
| 5,927,154 | A | 7/1999 | Elton et al. | |
| 5,937,707 | A | 8/1999 | Rixon et al. | |
| 5,964,125 | A | 10/1999 | Rixon et al. | |
| 5,996,438 | A | 12/1999 | Elton | |
| 5,996,439 | A | 12/1999 | Elton et al. | |
| 6,006,626 | A | 12/1999 | Notake et al. | |
| 6,019,015 | A | 2/2000 | Elton | |
| 6,023,995 | A | 2/2000 | Riggle | |
| 6,041,674 | A | 3/2000 | Kato | |
| 6,055,883 | A | 5/2000 | Kato | |
| 6,070,489 | A | 6/2000 | Ananthasivan et al. | |
| 6,073,515 | A | 6/2000 | Elton et al. | |
| 6,082,219 | A | 7/2000 | Wolpert | |
| 6,101,896 | A | 8/2000 | Engelgau | |
| 6,109,241 | A | 8/2000 | Engelgau | |
| 6,134,987 | A | 10/2000 | Kalsi | 74/560 |
| 6,138,802 | A | 10/2000 | McFarlane et al. | |
| 6,151,984 | A * | 11/2000 | Johansson et al. | 74/512 |
| 6,151,985 | A | 11/2000 | Garber et al. | |
| 6,151,986 | A | 11/2000 | Willemsen et al. | |

| | | | | |
|---|---|---|---|---|
| 6,158,299 | A | 12/2000 | Czajkowski | |
| 6,178,847 | B1 | 1/2001 | Willemsen et al. | |
| 6,205,883 | B1 | 3/2001 | Bortolon | |
| 6,212,970 | B1 | 4/2001 | Bortolon | |
| 6,216,555 | B1 | 4/2001 | Malone | |
| 6,220,222 | B1 | 4/2001 | Kalsi | |
| 6,237,565 | B1 | 5/2001 | Engelgau | |
| 6,263,758 | B1 | 7/2001 | Kumamoto et al. | |
| 6,263,859 | B1 | 7/2001 | Kalsi | |
| 6,289,763 | B1 | 9/2001 | Rixon et al. | |
| 6,293,584 | B1 | 9/2001 | Levine | |
| 6,295,890 | B2 | 10/2001 | Rixon et al. | |
| 6,298,748 | B1 | 10/2001 | Rixon et al. | |
| 6,301,993 | B1 | 10/2001 | Orr et al. | |
| 6,305,239 | B1 | 10/2001 | Johansson et al. | |
| 6,314,813 | B1 | 11/2001 | Uhlig | |
| 6,324,939 | B1 | 12/2001 | Cicotte | |
| 6,345,550 | B1 | 2/2002 | Markham et al. | |
| 6,367,348 | B1 | 4/2002 | Toelke et al. | |
| 6,374,695 | B1 * | 4/2002 | Johansson et al. | 74/512 |
| 6,389,927 | B1 | 5/2002 | Willemsen | |
| 6,407,526 | B1 | 6/2002 | Black, III et al. | |
| 6,419,270 | B1 | 7/2002 | Boyle, III et al. | |
| 6,431,021 | B1 | 8/2002 | Djordjevic et al. | |
| 6,431,022 | B1 | 8/2002 | Cicotte | |
| 6,443,028 | B1 | 9/2002 | Brock | |
| 6,446,525 | B1 | 9/2002 | Borchers | |
| 6,453,767 | B1 | 9/2002 | Willemsen et al. | |

FOREIGN PATENT DOCUMENTS

| | | |
|---|---|---|
| EP | 0657319 | 6/1995 |
| EP | 0792218 | 9/1997 |
| EP | 0793581 | 9/1997 |
| EP | 0802869 | 10/1997 |
| EP | 0827885 | 3/1998 |
| EP | 0836968 | 4/1998 |
| EP | 0854071 | 7/1998 |
| EP | 0872373 | 10/1998 |
| EP | 0947392 | 10/1999 |
| EP | 0983539 | 3/2000 |
| EP | 0990782 | 4/2000 |
| EP | 0997361 | 5/2000 |
| EP | 1000391 | 5/2000 |
| EP | 1024421 | 8/2000 |
| EP | 1038742 | 9/2000 |
| EP | 1083472 | 3/2001 |
| EP | 1134128 | 9/2001 |
| EP | 1136901 | 9/2001 |
| EP | 1139195 | 10/2001 |
| EP | 1142767 | 10/2001 |
| EP | 1143322 | 10/2001 |
| EP | 1153783 | 11/2001 |
| EP | 1153785 | 11/2001 |
| EP | 1153786 | 11/2001 |
| EP | 1153805 | 11/2001 |
| EP | 1154345 | 11/2001 |
| EP | 1154346 | 11/2001 |
| EP | 1154347 | 11/2001 |
| EP | 1179761 | 2/2002 |
| EP | 1191417 | 3/2002 |
| EP | 1193148 | 4/2002 |
| FR | 2739947 | 4/1997 |
| JP | 4633934 | 11/1971 |
| JP | 487414 | 1/1973 |
| JP | 5122218 | 2/1976 |
| JP | 56086827 | 7/1981 |
| JP | 5890420 | 6/1983 |
| JP | 5897629 | 7/1983 |
| JP | 5897630 | 7/1983 |
| JP | 58113125 | 8/1983 |
| JP | 598835 | 1/1984 |
| JP | 60144814 | 7/1985 |
| JP | 6146612 | 3/1986 |
| JP | 6146613 | 3/1986 |
| JP | 625701 | 2/1987 |
| JP | 6251422 | 3/1987 |
| JP | 634312 | 1/1988 |
| JP | 634313 | 1/1988 |
| JP | 6349528 | 3/1988 |
| JP | 239214 | 2/1990 |
| JP | 2116911 | 5/1990 |
| JP | 2129710 | 5/1990 |
| JP | 33932 | 1/1991 |
| JP | 35629 | 1/1991 |
| JP | 342336 | 2/1991 |
| JP | 330116 | 3/1991 |
| JP | 330117 | 3/1991 |
| JP | 3129748 | 12/1991 |
| JP | 4504238 | 7/1992 |
| JP | 4255012 | 9/1992 |
| JP | 4505063 | 9/1992 |
| JP | 796787 | 4/1995 |
| JP | 7096784 | 4/1995 |
| JP | 7164934 | 6/1995 |
| JP | 7180573 | 7/1995 |
| JP | 7200088 | 8/1995 |
| JP | 7271464 | 10/1995 |
| JP | 7334261 | 12/1995 |
| JP | 7334262 | 12/1995 |
| JP | 822338 | 1/1996 |
| JP | 10320065 | 12/1998 |
| JP | 2000-000061 | 1/2000 |
| JP | 2000-027667 | 1/2000 |
| JP | 2000-148271 | 5/2000 |
| JP | 2000-213379 | 8/2000 |
| JP | 2000-233729 | 8/2000 |
| JP | 2000-293249 | 10/2000 |
| JP | 2000-326754 | 11/2000 |
| JP | 2001-082917 | 3/2001 |
| JP | 2001-109533 | 4/2001 |
| JP | 2001-116507 | 4/2001 |
| JP | 2001-121986 | 5/2001 |
| JP | 2001-121987 | 5/2001 |
| JP | 2001-121988 | 5/2001 |
| JP | 2001-125656 | 5/2001 |
| JP | 2001-130388 | 5/2001 |
| JP | 2001-134333 | 5/2001 |
| JP | 2001-134335 | 5/2001 |
| JP | 2001-138878 | 5/2001 |
| JP | 2001-147728 | 5/2001 |
| JP | 2001-147729 | 5/2001 |
| JP | 2001-151089 | 6/2001 |
| JP | 2001-154750 | 6/2001 |
| JP | 2001-158334 | 6/2001 |
| JP | 2001-163196 | 6/2001 |
| JP | 2001-166842 | 6/2001 |
| JP | 2001-171495 | 6/2001 |
| JP | 2001-175345 | 6/2001 |
| JP | 2001-180326 | 7/2001 |
| JP | 2001-180327 | 7/2001 |
| JP | 2001-180456 | 7/2001 |
| JP | 2001-219827 | 8/2001 |
| JP | 2001-260697 | 9/2001 |
| JP | 2001-278017 | 10/2001 |
| JP | 2001-290547 | 10/2001 |
| JP | 2001-290548 | 10/2001 |
| JP | 2001-312322 | 11/2001 |
| JP | 2002-006969 | 1/2002 |
| JP | 2002-059817 | 2/2002 |
| WO | 0034094 | 6/2000 |
| WO | 0114161 | 3/2001 |
| WO | 0122189 | 3/2001 |

| | | |
|---|---|---|
| WO | 0164576 | 9/2001 |
| WO | 0166977 | 9/2001 |
| WO | 0174627 | 10/2001 |
| WO | 0174628 | 10/2001 |
| WO | 0176924 | 10/2001 |
| WO | 0177772 | 10/2001 |
| WO | 0181110 | 11/2001 |
| WO | 0219051 | 3/2002 |

OTHER PUBLICATIONS

Electromechanical Brake System: Actuator Control Development System, SAE International, authors Maron, Dieckerman, Hauck, and Prinzler, dated Feb. 24–27, 1997.

The Development of An Automotive Drive–By–Wire Throttle System As A Research Tool, SAE International, authors Emtage, Lawson, Passmore, Lucas, and Adcock, dated Feb. 25–Mar. 1, 1991.

Brake by Wire for Commercial Vehicles, SAE International, authors Wrede and Decker, dated Nov. 16–19, 1992.

Delphi Electronic Throttle Control Systems For Model Year 2000; Driver Features, System Security, and OEM Benefits, Etc for The Mass Market, SAE International, authors McKay, Nichols, and Schreurs, dated Mar. 6–9, 2000.

New Approaches to Electronic Throttle Control, SAE International, authors Huber, Lieberath–Leden, Maisch, Reppich, dated Feb. 25–Mar. 1, 1991.

The Effectiveness of Adjustable Pedals Usage, SAE International, authors Parenteau, Shen, and Shah, dated Mar. 6–9, 2000.

Adjustable Pedals, author Mary Seelhorst, date unknown.

Woman Motorist Web Site, Ford's Power Adjustable Pedals: A Fantastic Feature, date unknown.

Driver Workspace State–Of–The–Art Analysis, author Woodson, WE; Selby, PH, dated Jun., 1975.

Auto–Solve Web Site, Miscellaneous Topics–Electronic Throttle Control—(Drive by Wire or Fly by Wire), date unknown.

Excerpt from the 1974 General Motors Service Manual for the Pontiac Grand Ville, pp. 5–1, 5–9, 6B–6 to 6B–9, date 1974.

Excerpt from the 1996 Chrysler Corporation Service Manual for the Dodge Viper GTS Coupe, pp. 5–9, 5–10, 5–48 to 5–52, date 1996.

Drive–by–wire systems for commercial vehicles and passenger cars–present status and future perspective, IMechE, author E. S. Mausner, date 1989.

Electronic Accelerator Pedal Assemblies and Environmental Considerations, author Ronald Smith, date unknown.

Evolution in Braking, Automotive Engineering, dated Aug. 1992.

Adjustable Pedal Pampers Drivers, Design News, dated Aug. 3, 1987.

* cited by examiner

ADJUSTABLE PEDAL ASSEMBLY

This application is a continuation of application of Ser. No. 09/654,642 filed Sep. 5, 2000 now U.S. Pat. No. 6,374,695 which is a continuation of Ser. No. 09/174,748, filed Oct. 19, 1998 now U.S. Pat. No. 6,151,984.

TECHNICAL FIELD

The present invention concerns an adjustable pedal assembly for a vehicle including a mounting arrangement for attaching the pedal assembly to a vehicle structure where a plurality of pedals are arranged pivotally relative to the mounting arrangement and are arranged pivotally relative to an adjustment element, with the pedals pivoting about one axis and the adjustment element pivoting about another axis.

BACKGROUND OF THE INVENTION

Conventional automotive technology has provided an adjustable driver's seat to accommodate drivers of various heights. Typically, seat adjusters can move the seat in various directions including up and down, fore and aft, and/or tilting the seat relative to the vehicle. This allows the driver to move closer to or farther away from vehicle control pedals. Another option used in the automotive industry to accommodate drivers having different heights, is to provide the vehicle with an adjustable steering wheel. The steering wheel is typically adjustable in a longitudinal direction in relation to the vehicle and can usually be adjusted vertically.

Despite the great adjustment possibilities that exist with these two different options, it is not always possible to find an optimal driving position if the mounting of the vehicle control pedals is fixed within the vehicle. A third option is to have vehicle control pedals that are selectively adjustable to accommodate drivers having different heights. One such adjustable pedal assembly is described in U.S. Pat. No. 4,870,871. The adjustable pedal assembly in this patent involves fastening the pedals along threaded shafts, whereby the pedals can be shifted horizontally toward or away from the vehicle driver through rotation of the shafts. This construction is complicated and expensive. Additionally, if the vehicle collides with another object, some of the pedal components in this design may come into contact with the driver, which is undesirable.

For an adjustable pedal assembly to operate well in practice, it is not sufficient that the pedals merely be shiftable toward and away from the driver. In positions where the pedals are far away, i.e., at a long distance from the driver, it is necessary that pedal pads be orientated in a more vertical position than is the case when the pedals are closer to the driver. A shorter driver, who moves the driver's seat closer to the steering wheel and higher up, will maneuver the pedals more from above than is the case with a tall driver who lowers the driver's seat and moves it away from the steering wheel.

Thus, it would be desirable to provide an adjustable pedal assembly that includes horizontal adjustment, i.e., adjustment in fore and aft directions with respect to the vehicle, and which includes angular adjustment of the pedal pads so that the pads can be angled upwardly when the pedals are closer to the driver. It is important that this pedal assembly include a drive arrangement for selectively adjusting pedal position that can be easily integrated in the vehicle. It is also desirable for the adjustable pedal assembly to to be designed such that if the vehicle is in a collision, the pedal components will not come into contact with the driver. Finally, the adjustable pedal assembly should be simpler in design and less expensive than prior art pedal assemblies.

SUMMARY OF THE INVENTION AND ADVANTAGES

An adjustable pedal assembly includes a mounting arrangement for attachment to a vehicle structure and at least one pedal pivotally supported with respect to the mounting structure. The pedal pivots about a first pivot axis. An adjustment element is pivotally supported with respect to the mounting structure and defines a second pivot axis. The adjustment element selectively moves the pedal between a plurality of operable positions. The assembly is characterized by the pedal being pivotally supported with respect to the adjustment element wherein the second pivot axis is generally parallel to the first pivot axis.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
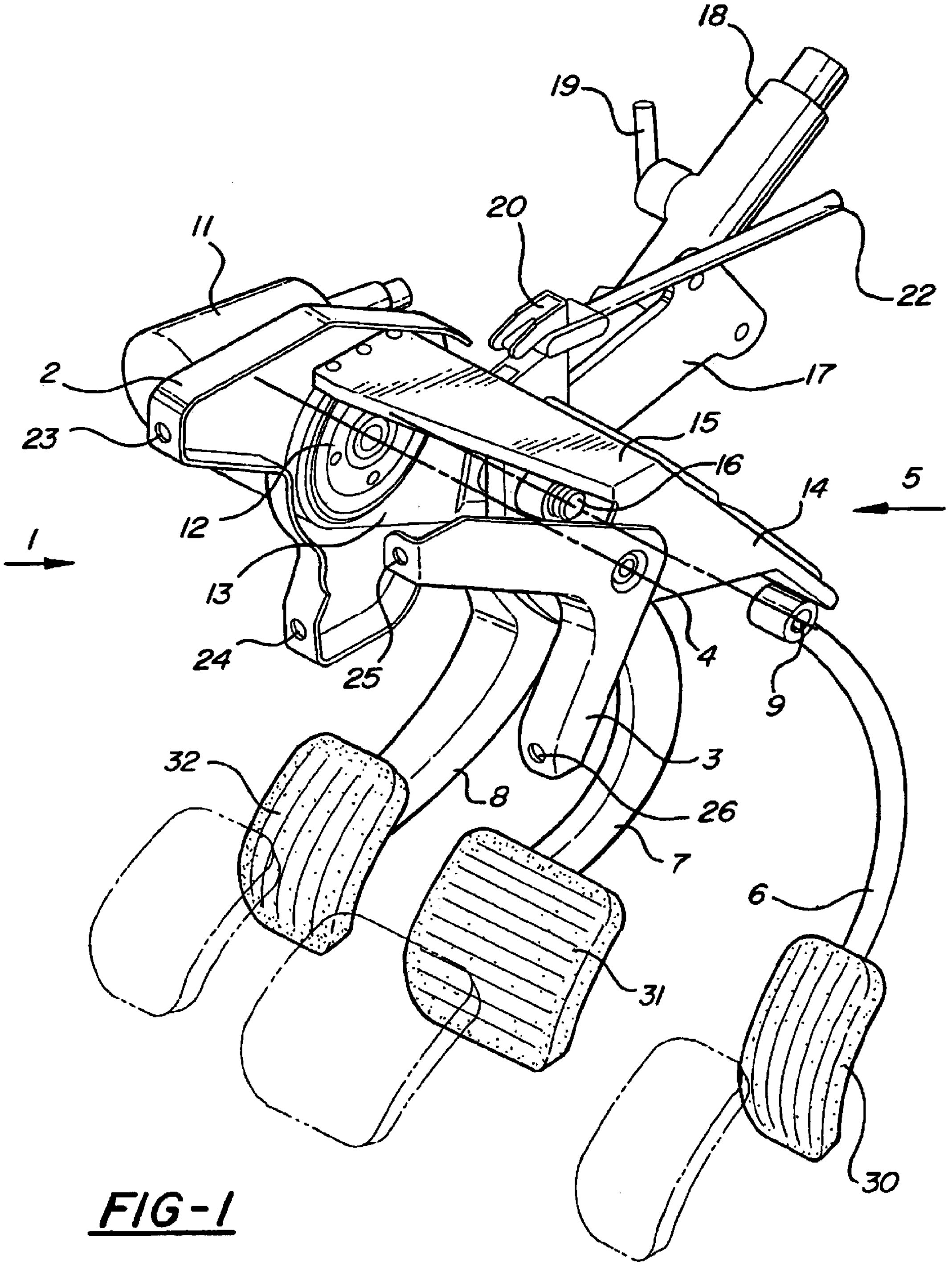
FIG. 1 is a perspective view of the subject adjustable pedal assembly.

Referring to the Figures, wherein like numerals indicate like or corresponding parts throughout the several views, an adjustable pedal assembly is shown in FIG. 1. The invention will be described below using directional and positional indications. These indications concern the conditions that prevail when the object of the invention is mounted in a vehicle. Thus, indications such as "left," "right," "forward (fore direction)," "rearward (aft direction)," etc. in the application concern corresponding indications as normally used in connection with a vehicle and should not be considered limiting.

In FIG. 1, reference number 1 generally concerns a mounting arrangement by which the adjustable pedal assembly is mounted to a vehicle structure 37. The mounting arrangement 1 is designed and situated to provide a securing of the pedal assembly in a special supporting bar that is separate from a vehicle cowl so that the pedal assembly is not affected by such movements that the cowl might make during a collision. The mounting arrangement 1 which thus will be designated as stationary relative to the vehicle, is comprised of a first fastening element 2 and a second fastening element 3 with fastening points 23 and 24 as well as 25 and 26, respectively. The two (2) fastening elements 2 and 3 have supports that define a pivot axis 4. Any type of fasteners known in the art can be used to fasten the fastening elements 2, 3 to the vehicle structure 37 at fastening points 23, 24, 25, 26.

The object of the invention also includes an adjustment element that is generally designated by 5. The adjustment element 5 is connected to the mounting arrangement 1 and is pivotal relative to the mounting arrangement about the pivot axis 4.

The adjustment element 5 serves to fasten and support a plurality of pedals 6, 7, 8 which are supported by the mounting arrangement 1. Each of the pedals 6, 7, 8 is connected to an actuator that is used to control a vehicle system. This will be discussed in greater detail below.

Preferably, pedal 8 is a clutch pedal used to activate a clutch mechanism for shifting gears within a vehicle. Pedal 7 is preferably a brake pedal used to activate a vehicle braking system and pedal 6 is preferably an accelerator pedal used to activate an engine throttle. While three (3) pedals 6, 7, 8 are shown, it should be understood that the adjustable pedal assembly could include more or less pedals. Each of the pedals 6, 7, 8 extends downwardly from the adjustment element 5 and terminates at a pedal pad 30, 31, 32, respectively. The pedal pads 30, 31, 32 are attached to free ends of the pedals 6, 7, 8 and are adapted to receive the driver's foot.

The pedals 6, 7, 8 are pivotally supported in the adjustment element 5 and are pivotal around a common pivot axis 9, which is shown in FIG. 1. The two (2) pivot axes 4 and 9 are essentially parallel to each other, and are approximately horizontal and crosswise relative to the longitudinal direction of the vehicle.

As an alternative to the common pivot axis 9 for the three (3) pedals 6, 7, 8, it is possible that each of the pedals 6, 7, 8 could be suspended around two or possibly three pivot axes separated from each other. In this embodiment also, the pivot axes are approximately parallel to each other, and are generally horizontal and orientated crosswise relative to the longitudinal direction of the vehicle.

Figure 3:
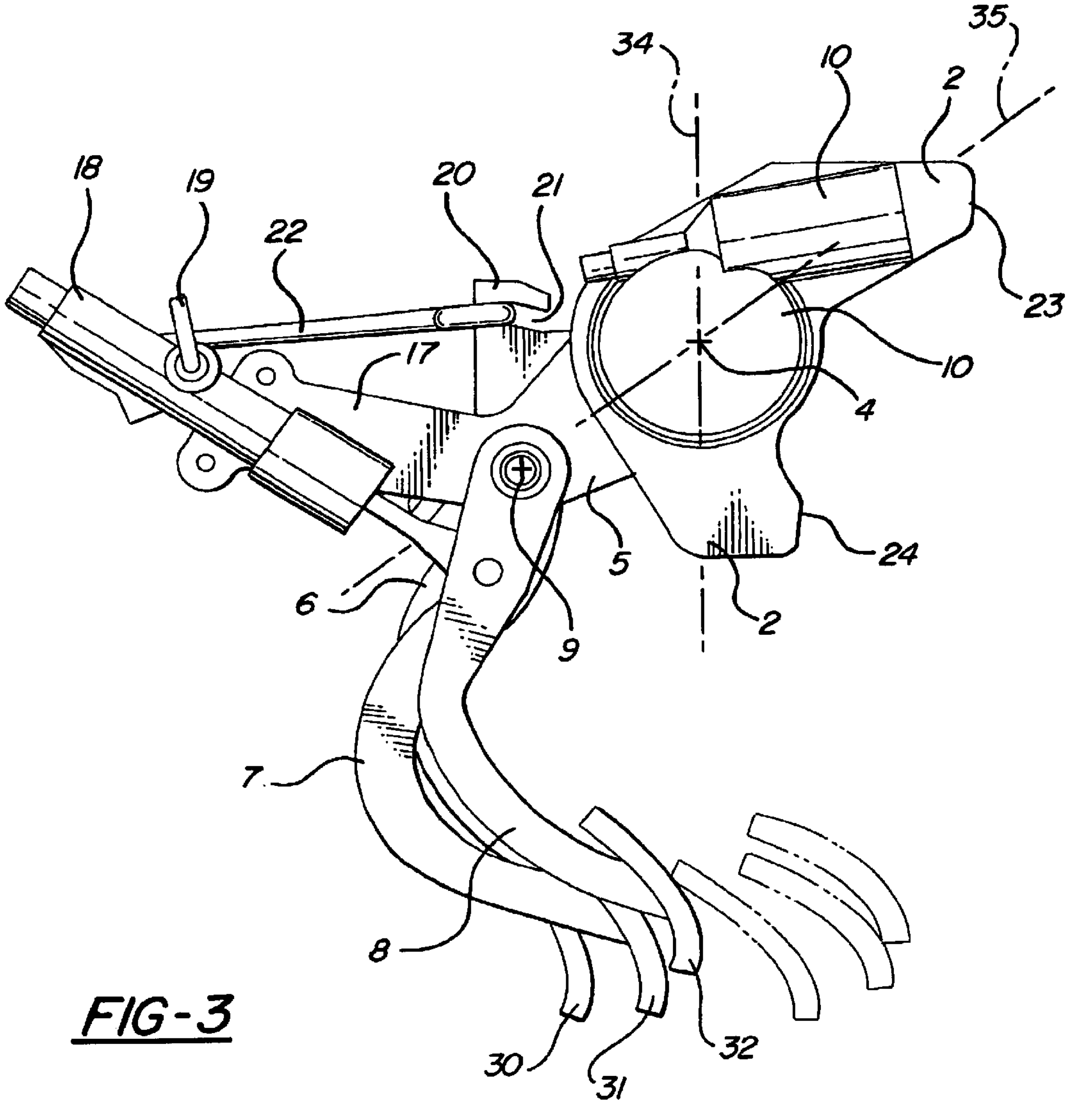
FIG. 3 is a side view of the adjustable pedal assembly shown in FIG. 1.

It is evident from the view in FIG. 3, which shows the adjustable pedal assembly from the side, that the pivot axis 9 for the pedals 6, 7, 8 is located beneath and in front of the pivot axis 4 for the adjustment element 5. Because the pedals 6, 7, 8 in the unactuated state are spring-tensioned to stop positions in the clockwise direction around the pivot axis 9, it is evident that with the pivoting of the adjustment element 5 around the pivot axis 4, the adjustment element 5 and the pedals 6, 7, 8 suspended on the adjustment element 5 will move as a rigid unit.

FIG. 3 shows the pedals 6, 7, 8 with solid lines in the unactuated state and in an initial position before such a pivoting and with dashed lines in the unactuated stated after such a pivoting. In other words, the solid lines show the position of the pedals 6, 7, 8 at their furthest position from the driver before they are pivoted as a unit about pivot axis 4 and the dashed lines show the position of the pedals 6, 7, 8 after they have been pivoted as a unit about pivot axis 4 and where the pedals 6, 7, 8 are in their closest position to the driver. It is evident from FIG. 3 that as the pedals 6, 7, 8 were pivoted about pivot axis 4, the pedal pads 30, 31, 32 were shifted rearwardly in the longitudinal direction of the vehicle to a considerable extent. Additionally, as the pedals 6, 7, 8 were pivoted about pivot axis 4, the pedal pads 30, 31, 32 were angled upwardly at an angle that is as great as the angle of rotation for the adjustment element 5 around the pivot axis 4. The pedal pads 30, 31, 32 are also lifted to a higher level.

In the example shown, the longitudinal shift of the pedal pads can be up to 100 mm with a pivot angle of about 18° around the pivot axis 4 at the same time as the pedal pads 30, 31, 32 are lifted about 20 mm. A corresponding angling up of the pads 30, 31, 32 is also effected. The position of the pivot axis 9 of the pedals 6, 7, 8 in the example illustrated means that in the initial position according to the drawing, an angle is formed between a vertical line 34 through the pivot axis 4 and a connecting line 35 between the pivot axis 4 and the pivot axis 9 of approximately 35°. It should be understood that the numerical quantities for the horizontal, vertical, and angular adjustments discussed above, are exemplary in nature and are not limiting.

A driving mechanism is used to selectively move the adjustment element 5 about the pivot axis 4. In the fastening element 2 of the mounting arrangement 1, shown in FIG. 2, a stator element 10 is attached to an angular gear assembly that can be selectively driven under the effect of an electric drive motor 11. The angular gear assembly has a rotor element 12, illustrated in FIG. 1, which rotates with respect to the stator element 10, and which is supported on the fastening element 2 to drive the adjustment element 5. Thus, with the rotation of the rotor element 12, the adjustment element 5 will follow the movement and hence pivot about the pivot axis 4.

The angular gear assembly is designed as a planetary gear that is self-braking and designed to handle very large rotational torques on the order of 1000 Nm (Newton-meters) or more. Thus, no locking element is required for locking the adjustment element 5 in the selected adjustment position. The gear assembly is also extremely compact in its outer dimensions which improves packaging.

As an alternative to the angular gear, a linear adjusting device can be coupled to a connecting element 15 that extends between fastening element 2 and fastening element 3, and which is located at a distance from the pivot axis 4. Optionally the linear adjusting device can be connected to an element that is non-rotationally connected to the connecting element 15.

To summarize, the pedals 6, 7, 8 in the adjustable pedal assembly are pivotally supported with respect to the adjustment element 5 wherein the second pivot axis 4 is generally parallel to the first pivot axis 9. The driving mechanism with the electric motor 11 and gear assembly is used to selectively rotate the adjustment element 5 about the second pivot axis 4. The pedals 6, 7, 8 are pivotally mounted within the adjustment element 5 to pivot about the first pivot axis 9, thus the position of the first pivot axis 9 moves with respect to the second pivot axis 4 when the adjustment element 5 is rotated.

The adjustment element 5 has two (2) opposite fastening ears 13 and 14, one on each side of the connecting element 15. One fastening ear 13 is connected to the rotor element 12 of the angular gear assembly. The other fastening ear 14 has an articulated connection with fastening element 3 so that the adjustment element 5 becomes pivotal around the above pivot axis 4. The connecting element 15 extends horizontally between the two (2) fastening ears 13, 14.

Figure 2:
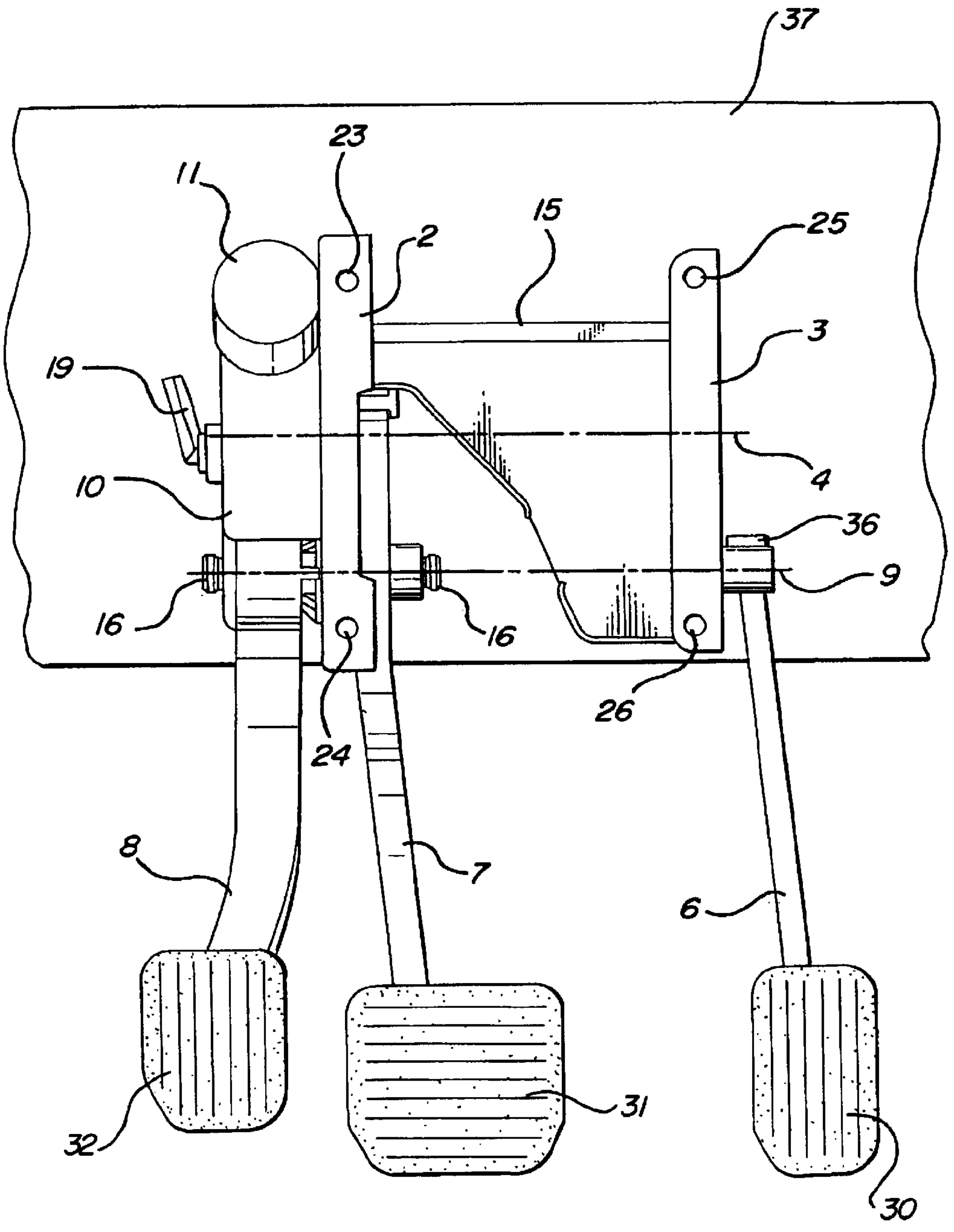
FIG. 2 is a front view of the adjustable pedal assembly shown in FIG. 1.

Fastening ear 13 on the adjustment element 5 extends forwardly from the rotor element 12 and serves to support a pivot pin 16, shown in FIG. 2. The pivot pin 16 rotatably supports the clutch 8 and brake 7 pedals and extends longitudinally along pivot axis 9 such that the pedals 7, 8 rotate about pivot axis 9.

The clutch pedal 8 is connected to an actuator that controls the vehicle clutch. The actuator includes a forward-directed arm 17 that is attached to the adjustment element 5, and which serves to fasten a maneuvering device 18 in the form of a piston/cylinder unit that is to be actuated by the clutch pedal 8. The maneuvering device 18 is connected to a freewheel clutch of the vehicle via a tube that is designated by 19. The tube 19 is readily bendable and deformable such that it cannot transfer any movements to the pedal assembly or components of the pedal assembly in the case of a vehicle collision. Thus, when the tube 19 experiences a load level that exceeds a predetermined limit, such as when the vehicle collides with another object, the tube 19 will bend and will prevent the clutch pedal 8 from contacting the driver.

The accelerator pedal 6 is connected to an actuator that controls the vehicle engine throttle. The accelerator pedal 6 is preferably connected to an electric control potentiometer 36, shown schematically in FIG. 2. The potentiometer 36 is fastened in the adjustment element 5 and emits an electric signal that is dependent on the position of the accelerator pedal 6 around the pivot axis 9. The potentiometer 36 is connected to the engine of the vehicle via electric lines. While an electronic throttle control configuration is preferred, the subject adjustable pedal assembly could be used in standard push-pull cable operated configurations.

The brake pedal 7 is connected to an actuator that controls the vehicle braking system. The brake pedal 7 has an arm 20 directed upwardly, which can be seen as an extension of the pedal 7 past the pivot axis 9. The upwardly directed an 20 has a recess 21 in which a drag link 22 is fastened. The opposite (front) end of the drag link 22 is connected to a brake servo located in the vehicle. By application of the upwardly directed arm 20 the brake pedal 7 will be swung forward (away from the driver) if the drag link 22 should be shifted rearwardly (toward the driver) during a vehicle collision. This will prevent the brake pedal 7 from coming into contact with the driver during a vehicle collision.

To make the brake function independent of the pivoting the adjustment element 5 around the pivot axis 4, the drag link 22 is located in the forward end position of the pedals 6, 7, 8 over a connection line between the pivot axis 4 and the forward fastening of the drag link 22 in the brake servo. With a counter-clockwise pivoting of the adjustment element 5, as seen in FIG. 3, such that the pedals 6, 7, 8 are shifted rearwardly in the vehicle, the drag link 22 will pass down on the underside of the connection line. Suitably, the drag link 22 is located symmetrically around the connection line in the two extreme positions of the pedals 6, 7, 8.

The maneuvering device designed as a piston/cylinder unit 18 for the clutch pedal 8 can be omitted and replaced with an arrangement of the type described above in connection with the brake pedal 7. It is also conceivable to use a hydraulic transfer with the brake pedal 7 of the type describe in connection with the clutch pedal 8. With regard to the accelerator pedal 6, a mechanical connection such as a wire or cable, can be used as an alternative to the electrical transfer described above.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An adjustable pedal assembly comprising:

a mounting arrangement (1, 2, 3) for attachment to a vehicle structure (37);

at least one pedal (6, 7, or 8) having first and second ends and supported for pivotally moving about a first pivot axis (9) between rest and applied positions;

an adjustment element (5) pivotally supported on said mounting arrangement (1, 2, 3) about a second pivot axis (4) with said second pivot axis (4) remaining fixed relative to said mounting arrangement (1, 2, 3) as said adjustment element (5) pivotally moves between various adjusted positions;

said first pivot axis (9) supporting said first end of said pedal (6, 7, or 8) on said adjustment element (5) spaced from said second pivot axis (4) for pivotal movement relative to said adjustment element (5) with said first pivot axis (9) being generally parallel to said second pivot axis (4), a drive mechanism operably connected to said adjustment element (5) for selectively rotating said adjustment element (5), said pedal (6, 7, or 8), and said first pivot axis (9) about said second pivot axis (4) between said various adjusted positions for selectively moving said pedal (6, 7, or 8) between a plurality of operable positions without pivotally moving said pedal (6, 7, or 8) about said first pivot axis (9) relative to said adjustment element (5); and an electric signal generator responsive to pivotal movement of said pedal (6, 7, or 8) for electrically controlling a vehicle system in response to pivotal movement of said pedal (6, 7, or 8) about said first pivot axis (9) in a range between said rest and applied positions independently of said pedal (6, 7, or 8) moving between any one of said operable positions defined by said adjusted positions of said adjustment element (5) about said second pivot axis (4).

2. An assembly as set forth with claim 1 including a second pedal (6, 7, or 8) pivotally supported by said adjustment element (5) whereby said adjustment element (5) simultaneously adjusts the operational positions of both of said pedals.

3. An assembly as set forth in claim 1 wherein said electric signal generator is connected to said pedal (6, 7, or 8) and directly responsive to pivotal movement of said pedal (6, 7, or 8).

4. An assembly as set forth in claim 3 wherein said electric signal generator is further defined as a potentiometer (36) that emits an electric signal varying with the pivotal position of said pedal (6, 7, or 8) between said rest and applied positions about said first pivot axis (9).

5. An assembly as set forth in claim 3 wherein said at least one pedal (6, 7, or 8) includes an accelerator pedal (6) extending downwardly from said adjustment element (5) and terminating at an accelerator pedal pad (30).

6. An assembly as set forth in claim 5 wherein said adjustment element (5) adjusts an angular position of said accelerator pedal pad (30) when selectively rotated by said drive mechanism.

7. An assembly as set forth in claim 1 wherein said drive mechanism includes a gear assembly with a rotor element (12) that is driven by an electric motor (11).

8. An assembly as set forth in claim 1 wherein said second pivot axis (4) is located vertically above said first pivot axis (9).

9. An assembly as set forth in claim 8 wherein said adjustment element (5) maintains said first pivot axis (9) at a lower vertical position than said second pivot axis (4) at all adjusted positions.

10. An assembly as set forth in claim 1 wherein an angle formed between a connection line (35) extending between said first (9) and second (4) pivot axes and a vertical line (34) extending perpendicular to said second pivot axis (4) is in the range of 30° to 40°.

11. An adjustable pedal assembly comprising:

a mounting arrangement (1, 2, 3) for attachment to a vehicle structure (37);

a pedal (6, 7, or 8) pivotally supported about a first pivot axis (9) for rotation between rest and applied positions about said first pivot axis (9);

an adjustment element (5) pivotally supported on said mounting arrangement (1, 2, 3) about a second pivot axis (4) with said second pivot axis (4) remaining fixed relative to said mounting arrangement (1, 2, 3) as said adjustment element (5) pivotally moves between various adjusted positions;

said first pivot axis (9) supporting said pedal (6, 7, or 8) on said adjustment element (5) for pivotal rotation relative to said adjustment element (5) with said first pivot axis (9) being generally parallel to said second pivot axis (4), a drive mechanism operably connected to said adjustment element (5) for selectively rotating said adjustment element (5), said pedal (6, 7, or 8), and said first pivot axis (9) about said second pivot axis (4) between said various adjusted positions for selectively moving said pedal (6, 7, or 8) between a plurality of operable positions without pivotally rotating said pedal (6, 7, or 8) about said first pivot axis (9) relative to said adjustment element (5); and an electric output control operatively connected to said pedal (6, 7, or 8) and directly responsive to pivotal rotation of said pedal (6, 7, or 8) about said first pivot axis (9) between said rest and applied positions for electrically controlling a vehicle system response to pivotal rotation of said pedal (6, 7, or 8) independently of said pedal (6, 7, or 8) moving between any one of said operable positions defined by said adjusted positions of said adjustment element (5) about said second pivot axis (4).

12. An assembly as set forth in claim 11 wherein said pedal (6, 7, or 8) has first and second ends with said first end being mounted to said adjustment (5) and said second end supporting a pedal pad (30, 31, or 32).

13. An assembly as set forth in claim 12 wherein said adjustment element (5) adjusts an angular position of said pedal pad (30, 31, or 32) when selectively rotated by said drive mechanism.

14. An assembly as set forth in claim 11 wherein said electric output control is further defined as a potentiometer (36) that emits an electric signal varying with the pivotal position of said pedal (6, 7, or 8) between said rest and applied positions about said first pivot axis (9).

15. An assembly as set forth in claim 11 wherein said second pivot axis (4) is located vertically above said first pivot axis (9).

16. An assembly as set forth in claim 15 wherein said adjustment element (5) maintains said first pivot axis (9) at a lower vertical position than said second pivot axis (4) at all adjusted positions.

17. An adjustable pedal assembly comprising:

a mounting arrangement (1, 2, 3) for attachment to a vehicle structure (37);

a pedal (6, 7, or 8) pivotally supported about a first pivot axis (9) with respect to said mounting arrangement (1, 2, 3) for rotation between rest and applied positions about said first pivot axis (9);

an adjustment element (5) pivotally supported about a second pivot axis (4) with respect to said mounting arrangement (1, 2, 3) with said second pivot axis (4) remaining fixed relative to said mounting arrangement (1, 2, 3) as said adjustment element (5) pivotally moves between various adjusted positions about said second pivot axis (4);

said first pivot axis (9) supporting said pedal (6, 7, or 8) on said adjustment element (5) with said adjustment element (5) selectively moving said pedal (6, 7, or 8) between a plurality of operable positions during said pivotal movement between said various adjusted positions about said second pivot axis (4) without pivotally rotating said pedal (6, 7, or 8) about said first pivot axis (9), said first pivot axis (9) being generally parallel to said second pivot axis (4); and an electrical generator mounted adjacent said pedal (6, 7, or 8) and responsive to rotation of said pedal (6, 7, or 8) for emitting an electric signal that varies with said rotational position of said pedal (6, 7, or 8) between said rest and applied positions around said first pivot axis (9) independently of movement of said pedal (6, 7, or 8) between said plurality of operable positions defined by said adjusted positions of said adjustment element (5) about said second pivot axis (4).

18. An assembly as set forth in claim 17 wherein said pedal (6, 7, or 8) has first and second ends with said first end being mounted to said adjustment element (5) and said second end supporting a pedal pad (30, 31, or 32).

19. An assembly as set forth in claim 18 wherein said adjustment element (5) adjusts an angular position of said pedal pad (30, 31, or 32) during said movement between said various adjusted positions.

20. An assembly as set forth in claim 17 wherein said electrical generator is further defined as a potentiometer (36) for emitting the electric signal that varies with said rotational position of said pedal (6, 7, or 8).

21. An assembly as set forth in claim 17 further including a drive mechanism operably connected to said adjustment element (5) for selectively rotating said adjustment element (5), said pedal (6, 7, or 8), and said first pivot axis (9) about said second pivot axis (4) between said various adjusted positions.

22. An assembly as set forth in claim 21 wherein said drive mechanism includes a gear assembly with a rotor element (12) that is driven by an electric motor (11).

23. An assembly as set forth in claim 17 wherein said second pivot axis (4) is located vertically above said first pivot axis (9).

24. An assembly as set forth in claim 23 wherein said adjustment element (5) maintains said first pivot axis (9) at a lower vertical position than said second pivot axis (4) at all adjusted positions.

25. An assembly as set forth in claim 17 wherein an angle formed between a connection line (35) extending between said first (9) and second (4) pivot axes and a vertical line (34) extending perpendicular to said second pivot axis (4) is in the range of 30° to 40°.

* * * * *

UNITED STATES PATENT AND TRADEMARK OFFICE

CERTIFICATE OF CORRECTION

PATENT NO. : 6,918,316 B2
DATED : July 19, 2005
INVENTOR(S) : Johansson et al.

It is certified that error appears in the above-identified patent and that said Letters Patent is hereby corrected as shown below:

Column 7,
Line 23, before "response" insert -- in --.
Line 31, after "adjustment" insert -- element --.

Signed and Sealed this

Fifteenth Day of November, 2005

JON W. DUDAS
*Director of the United States Patent and Trademark Office*